Patented July 16, 1940

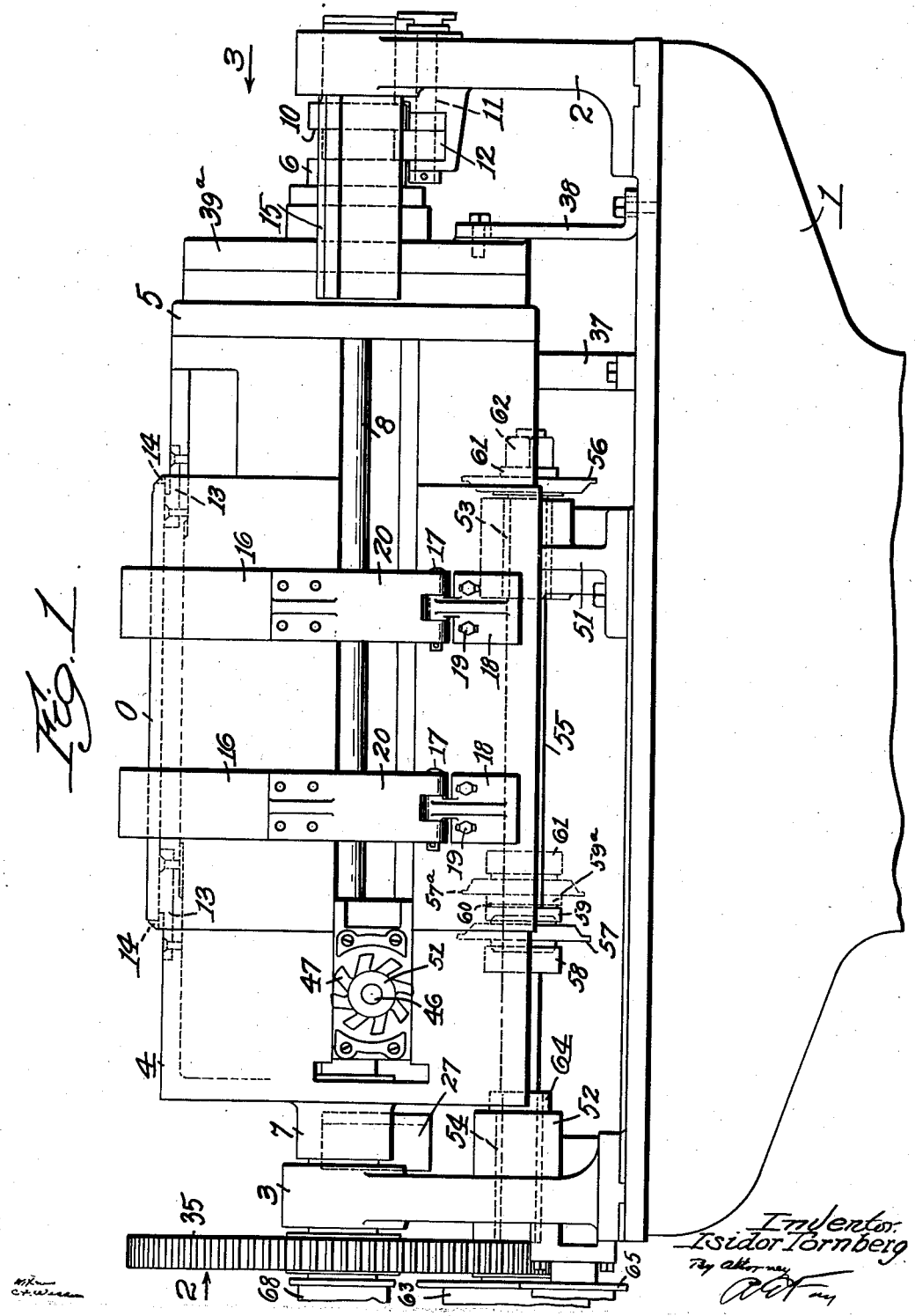

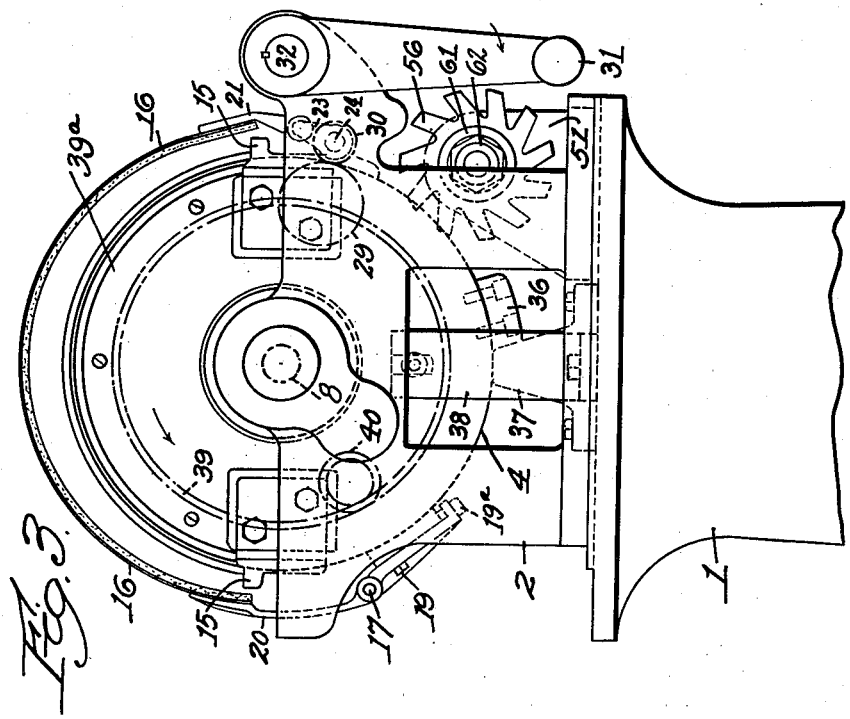
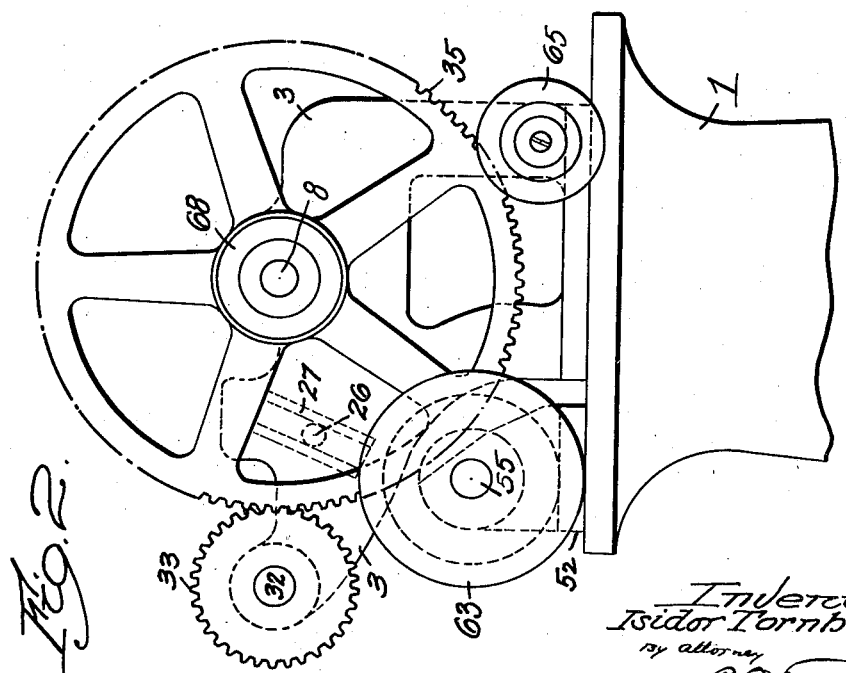

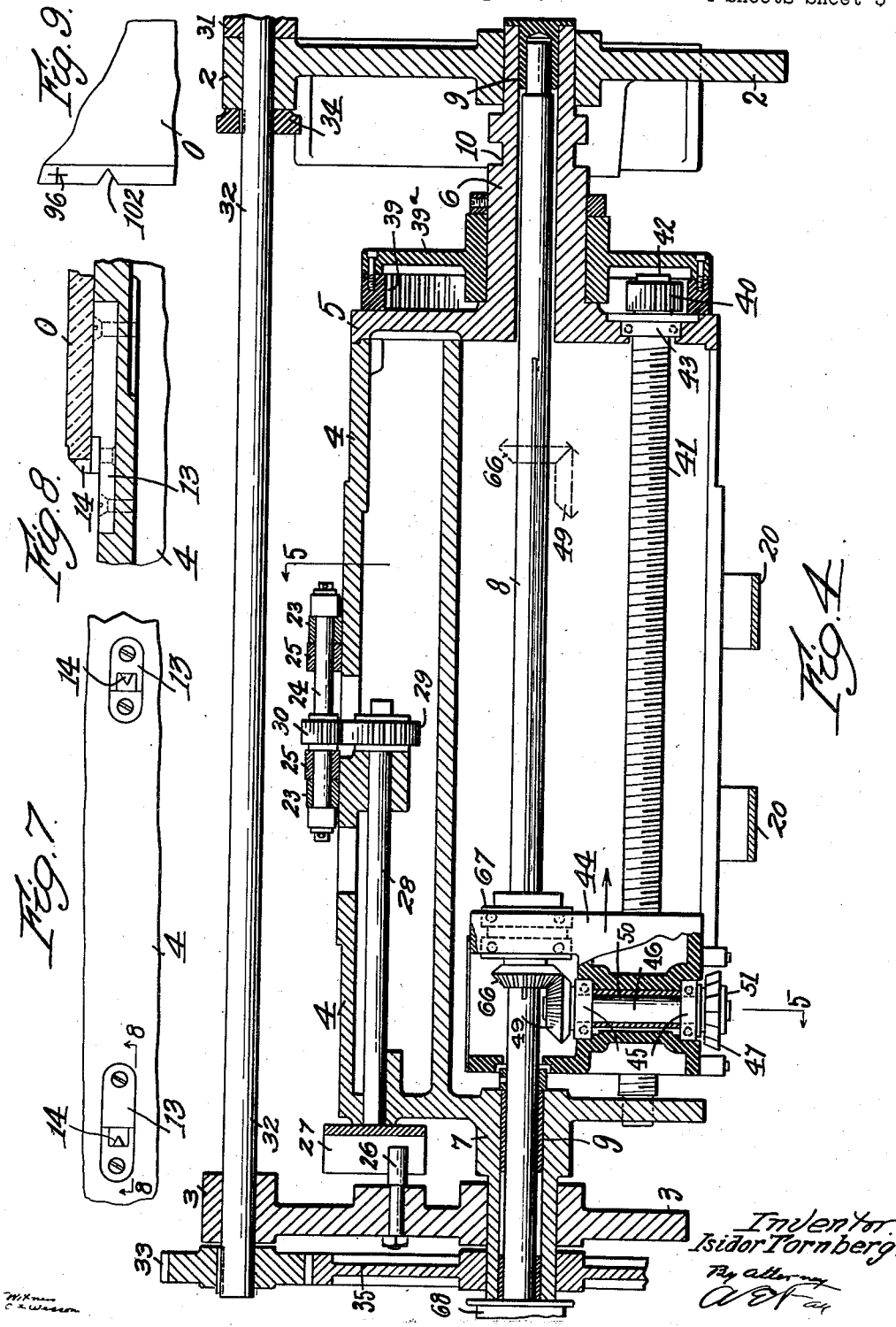

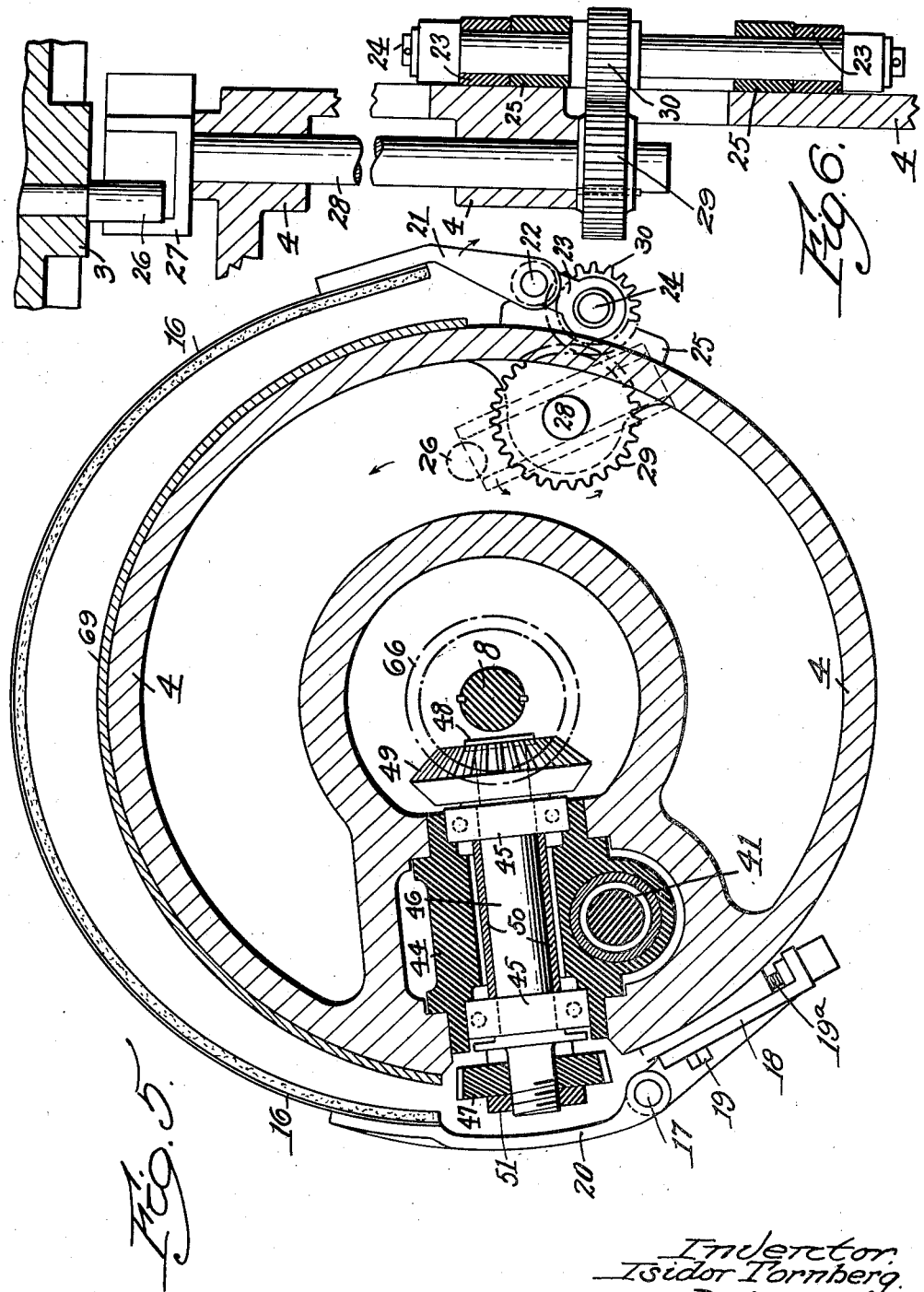

2,207,993

UNITED STATES PATENT OFFICE 2,207,993

MACHINE FOR TREATING PREREGISTERED PRINTING PLATES

Isidor Tornberg, Plainfield, N. J., assignor to Wood Newspaper Machinery Corporation, Plainfield, N. J., a corporation of Virginia Application August 10, 1937, Serial No. 158,268

9 Claims. (Cl. 29—21)

This invention relates to a machine for trimming, or otherwise treating, castings or even forgings which already have been permanently registered in such a way that they can be placed on this machine in only one place so that, when they have been treated in this machine, they will all be exactly alike. Although broadly having the principle set forth above, this invention is particularly applicable to the trimming of the edges of semi-cylindrical stereotype printing plates, especially where multiple color printing is involved and where it is desired that identical plates be produced and placed in identical positions on the printing plate cylinders, thus obviating overrunning of the various colors at the edges of the plates.

The principal objects of the invention are to provide a new and useful method of registering printing plates; to provide preregistration in such a manner that a considerable amount of time and effort in placing the plates properly on this machine and on the press cylinders may be saved; to provide means whereby the plates may be trimmed to fit the usual plate locking means on the press without the necessity of employing locating pins, packing, etc. on the press and yet secure correct registration; to provide a combination of means for accurately and speedily locating a plate previously registered upon a set of locating blocks; to provide a method of locating the plate and then machining three edges of the plate, including the two beveled curved ends; to provide a machine which will accomplish the accurate machining of not only the two curved end edges but a side edge simultaneously, although these machining operations may be done separately, without departing from the scope of the invention; to provide a machine cooperating with a registering machine which will definitely place a notch or two notches in a plate to cooperate with the means for accurately locating the plate on this machine; to provide a trimming machine on which the registered plates can be placed without loss of time and which will enable the plates to be produced in a uniform manner so that they can be placed on plate cylinders which are themselves uniform in construction and maintain the register so that plates on one printing couple will be exactly located on the plate cylinders and located on the succeeding couple in an easy and efficient manner and in perfect registration with those on the first couple, and to provide a construction in which, if a plate is imperfect, due to some process in the stereotyping or electrotyping, this fact will have to be discovered and the plate thrown out before it is sent into the press room and remade so as to fit in the proper place, or discarded.

Other objects and advantages of the invention will appear hereinafter.

Reference is to be had to the accompanying drawings, in which

Fig. 1 is an elevation of a plate trimming machine constructed in accordance with this invention;

Fig. 2 is an elevation of the left hand or pulley end of the machine, as indicated in the arrow 2 in Fig. 1;

Fig. 3 is an elevation of the right hand or operating end of the machine, as indicated by the arrow 3 in Fig. 1;

Fig. 4 is a central longitudinal sectional view through the machine;

Fig. 5 is a cross sectional view on the line 5—5 of Fig. 4;

Fig. 6 is a longitudinal sectional view constituting an enlargement of the parts shown in the upper part of Fig. 4;

Fig. 7 is a plan of the portion of the cylinder showing the registering devices thereon;

Fig. 8 is a longitudinal sectional view on the line 8—8 of Fig. 7 showing the means for registering one end of the plate, and Fig. 9 is a plan of a plate as it comes to this machine.

This machine is to be used in connection with a registering machine such as shown in my application Serial No. 156,252, filed July 29, 1937, or some other form of machine, for registering a series of printing plates by means of positive notches or the like thereon.

The plant in which this trimming machine is used comprises a registering machine in which the plates 0 are placed according to register crosses 96 on the four corners, preferably, of the plates and in four places on the frame of the machine. Each plate is set in the registering machine with these marks in registration, mirrors 93 of said application being used to secure fine adjustment. The plate is fixed in position and broaches, or other cutting means, are operated radially through the curved end edges of the plate to provide registering notches 102. These notches are placed in the previously cast plate after all shrinkage in cooling has taken place so that they are located accurately. The plate is removed by hand, as shown here, from the registering machine and set on the trimming machine with its two notches 102 set between the two registering pins 14 thereon, which are just far enough apart to receive the plate and hold it firmly in exactly registered position. Then the machine is operated to trim the edges of the plate that are desired to be trimmed, as the two curved end edges and one straight edge. All plates that go through this machine must be finished exactly alike, in registration. Now the plate is removed from the trimming machine, by hand, and transferred to the plate cylinder in the press room and set on that cylinder in exactly registered position since the finished straight edge of the plate is placed against a margin bar and the plate clamped by its beveled curved edges.

The machine is provided with a main frame 1 carrying brackets 2 and 3 which are bolted to, and become a part of, this frame. It carries a plate cylinder 4 and an attached end 5 therefor, which becomes a part of the cylinder 4. They are connected together and rotate together freely in the brackets 2 and 3. The cylinder and end have hollow journals 6 and 7 which accommodate bushings 9 in which splined shaft 8 is mounted. The shaft 8 is rotated through its pulley 68 independently of the cylinder 4.

The journal 6 of the cylinder end 5 is provided with a circumferential groove 10. In this groove operates a yoke 12 threadedly mounted on a screw 11 that passes through and is supported by the bracket 2. The screw is held from moving lengthwise by a collar at each end on the screw. Therefore, the screw 11 adjustably controls the end motion of the plate cylinder 4.

In the surface of the plate cylinder 4 are located blocks containing radial pins 14, preferably triangular in cross section. These pins engage in the notches 102 cut in the plate 0 by the registering machine, as stated. These notch pins correctly align the plate on the plate cylinder 4 in relation to the cutters, to be described, and make it practically impossible to place a plate on this cylinder 4, except in properly registered condition. At the same time, if any plate comes through the registering machine improperly registered or imperfect in any other way so that the registration notches are not in proper position, that fact will have to be discovered and the plate taken off this machine without having its edges trimmed. This plate would be sent back to be remade, or discarded, before it would be sent to the press room.

Fixed to the bracket 2 are a pair of plate supports or tracks 15 which properly support the two edges of one end of the plate and which support the plate as it is moved by hand on the cylinder 4. The plate is always supported by one-half of the cylinder. Carried by the cylinder are, in this instance, a pair of flexible straps 16 which extend part way around the cylinder and are adapted to be moved to hold the plate on the cylinder. These straps constitute the plate holding means. They are pivoted by means of pins 17 to brackets 18 fixed to the cylinder at one side and adjustable by means of bolts 19, the adjustment being fixed by bolts 19a. The straps are connected with the pins by strap holders 20 of metal and at the other end are strap holders 21 similarly located and pivoted by hinge pins 22 to levers 23 pivoted on a shaft 24 mounted on brackets 25, bolted to the plate cylinder 4. It is by turning this shaft 24 that the strap holders 21 are brought down so as to secure the plates by the straps and hold the plates in position on the cylinder while the necessary operations are being carried out. This is sufficient to keep the plate in position during that time.

The operation of the strap holders is brought about by means of a stationary pin 26 carried by the bracket 3. The rotation of the plate cylinder 5 eventually brings an oscillating bifurcated cam 27 into contact with the pin 26 which enters the cam and turns it on its own axis. This cam is centrally fixed on an oscillatory shaft 28, which is longitudinal. The pin is adapted to enter between the two sides of the cam and turn the cam while the stationary pin relatively moves along it. The shaft 28 has bearings inside the plate cylinder 4 and is provided on the opposite end with a gear 29 which rotates a gear 30 attached to said parallel shaft 24 mounted in the plate cylinder 4 outside its circumference. The shaft 24 also carries the levers 23 just mentioned to which are pivoted the strap holders 21. It is through this oscillating motion of the shaft 28 that the straps are automatically tightened down on the plate and also loosened therefrom at the end of the oscillation of the plate cylinder and its plate.

The plate cylinder is oscillated through a hand crank 31 fastened to one end of a shaft 32. A pinion 33 is secured to the opposite end. The shaft 32 is mounted in the brackets 2 and 3 and is prevented from moving endwise by a collar 34. The pinion 33 engages a gear 35 which is secured to the hub or journal 7 which is part of cylinder 4. Rotation of the crank 31 by hand, therefore, will cause the cylinder 4 to revolve. This will carry with it the cam 27 until it engages the pin 26 projecting from the bracket 3. This, of course, turns the cam 27 and causes the gear 29 to revolve and rotate the shaft 24 which turns the levers 23 for tightening up the strap holders 21.

When the plate cylinder 4 goes through its arc of motion, it is stopped by a stop block 36 coming into contact with a stationary stop 37. Then motion of the handle 31 is reversed and the cylinder rotated back until the edges of the plate register with the tracks 15. The straps 16 are loosened by the cam 27 leaving the pin 26, and the plate can be removed by hand on the tracks 15.

A disc 39a is adjustably fixed in stationary position by being bolted to a bracket 38. This bracket contains a slotted foot allowing for adjustment when the cylinder 4 is to be adjusted. It also is bolted through said foot to the frame 1. The disc 39a carries a fixed internal gear 39 in which runs a planetary gear 40 held on the end of a screw shaft 41 by a washer 42. The shaft 41 is mounted in the plate cylinder 4 by means of a bearing 43 and is threadedly mounted in a carriage 44 carried on the shaft 8 and by a slot in cylinder 4. The thread on the shaft 41 is cut so that when the cylinder 4 rotates and causes the shaft 41 to rotate, the carriage 44 will be drawn along longitudinally in a slot in the cylinder 4, provided for this purpose.

This carriage 44, by means of ball bearings 45, carries a shaft 46 which has secured at one end a rotary cutter 47. At the opposite end, secured by a washer 48, is a bevel gear 49. The shaft 46 is held in place by the bevel gear 49, spacers 50 and lock nut 51, as well as the cutter 47. The bevel gear 49 meshes with a bevel gear 66 which is slidably mounted on the splined shaft 8 and is held in the carriage 44 by a ball bearing mounting 67.

The spline shaft 8 extends beyond the plate cylinder 4 and on the left hand end is fastened a pulley 68 which, when connected to a suitable drive, will cause the shaft 8 to revolve and cause the shaft 46 and the cutter 47 to turn. As this cutter is mounted on the carriage 44 it will simultaneously move longitudinally and trim one straight edge of the plate.

On the frame 1 are bolted brackets 51 and 52 which carry bearings 53 and 54 that mount a shaft 55. The shaft 55 is of sufficient length so that rotary form cutters 56 and 57 mounted thereon when carried against the curved beveled ends of the plate will trim said plate to predetermined dimensions. The cutter 56 is secured against a shoulder on the shaft 55 by a washer 61 and nut 62. The cutter 57 is made in two halves, for ease in assembly. They are held together by collars 58 and 59, locking against beveled shoulders of the cutter 57. If on the same machine it is required to trim two plates of different lengths two standard collars 59 and 59a with a suitable spacer 60 between to provide the exact change in length are locked on the shaft at a predetermined position. The collar 58 is turned back, the cutter 57 is removed and a similar cutter 57A is placed on the shaft, to be locked there by a collar 61. The shaft 55 extends beyond a bracket to the left where a pulley 63 is mounted thereon in line with the pulley 68. The pulley 63 and a collar 64 hold the shaft 55 in a longitudinal position. The pulleys 63 and 68 may be driven separately or may utilize the same drive. A pulley 65 is a belt guide.

A plate 0 to be machined is placed upon the support guides 15 and is then pushed on the cylinder 4 under the straps 16 and the notches that were marked on the plate by the plate registering device engage notch pins 14. The crank 31 is then revolved causing the straps 16 to be tightened against the plate and holding it firmly in place. When the straps 16 are tight the lever 23 has been brought to a point that causes the tightening mechanism to lock itself and when this is accomplished the pin 26 leaves the cam 27.

The carriage 44 will be drawn along the slot in the cylinder 4, carrying the cutter 47 along the straight edge of the plate for its entire length while the plate cylinder goes through its arc of motion. That is controlled by the stop block 36 coming into contact with the stop 37. While the cylinder 4 is moved through its arc of motion form cutters 56 and 57 are trimming the beveled edges of the plate to conform to the press lockup arrangement.

When the cylinder 4 completes its arc of motion, the direction of motion is reversed, the plate is moved away from the cutters, the pin 26 engages the cam 27 and unlocks the tightening mechanism, unloosening the straps 16 so that the plate may be withdrawn from the machine.

Thin plates of the same outside diameter as thick plates can be machined by placing a plate sleeve 69 upon cylinder 4 before a plate is applied to it.

It is now apparent that like plates registered accurately on the plate registering device may be machined or trimmed on this invention so that when the series of plates are locked in the press, accurate alignment of corresponding parts from one printing couple to that of the next couple may be maintained.

Having thus described my invention and the advantages thereof, I do not wish to be limited to the details herein disclosed, otherwise than as set forth in the claims, but what I claim is:

1. In a machine for trimming a curved stereotype printing plate having opposite notches in its curved edges, the combination of a curved support for the printing plates provided with pins projecting radially from opposite ends far enough apart to fit the two notches in each plate, and straps passing over the plate to hold it in position.

2. In a machine for trimming a curved stereotype printing plate having opposite notches in its curved edges, the combination of a curved support for the printing plates provided with pins projecting radially from opposite ends far enough apart to fit the two notches in each plate, straps passing over the plate to hold it in position, and means for trimming one edge of the plate when so held.

3. In a machine for trimming a curved stereotype printing plate having opposite notches in its curved edges, the combination of a curved support for the printing plates provided with pins projecting radially from opposite ends far enough apart to fit the two notches in each plate, straps passing over the plate to hold it in position, means for trimming one longitudinal edge of the plate, and means for trimming the two curved end edges of the plate.

4. In a machine for trimming a plate, the combination of a central hub, a shaft rotatable thereon, a gear on the hub, means for turning said gear and the hub by hand, a cylinder for receiving the printing plate centered on said shaft but rotatable independently thereof, said hub being fixed to the gear, a cam on the cylinder which will engage the pin as the cylinder is rotated, a shaft adapted to be turned by the cam, and means operated by the last named shaft for holding the plate against the cylinder.

5. In a machine for trimming a curved stereotype plate, the combination of a cylinder for receiving the printing plate, a central shaft mounted in hollow hubs of the cylinder, means for rotating said cylinder by hand, a pin in fixed position, a cam, carried by the cylinder, which will engage the pin as the cylinder is rotated, a shaft mounted inside the cylinder and adapted to be turned by the cam, means operated by said shaft for holding the plate against the cylinder, means for operating the central shaft, and means operated by the central shaft for trimming a straight edge of the plate.

6. In a machine for trimming curved stereotype printing plates, the combination of a central shaft, a cylinder for receiving the printing plate to be trimmed centered on said shaft but rotatable independently thereof, an edge trimming cutter rotated by said shaft, an internal gear in fixed position centered on said shaft, a pinion carried by the cylinder and meshing with said gear, and a screw operated by said pinion for moving said cutter longitudinally of the cylinder while it is rotating on its own axis.

7. The combination of a cylinder, means for registering a printing plate on said cylinder, means for holding the plate against the surface of the cylinder, a rotary cutter movable along the cylinder for trimming the straight edge of the plate, a shaft, means for rotating said shaft, and rotary cutters on said shaft for trimming the curved edges of said plate.

8. In a machine for trimming a stereotype printing plate, the combination of a central shaft, means for rotating said shaft, a radial shaft, means for rotating the radial shaft from the central shaft, a rotary cutter on the radial shaft, a screw for moving said cutter along the shaft, and means for operating said screw when the cylinder rotates.

9. In a curved stereotype plate trimming machine, the combination of a rotary plate support having a semicylindrical surface, means for rotating it by hand, a stop block on said support, a fixed stop against which the stop block engages at the end of a revolution, a central shaft on which said support is rotatably mounted, a pair of cutters for trimming the curved edges of the plate, a shaft on which said cutters are mounted, and means for rotating the last named shaft.

ISIDOR TORNBERG.